United States Patent
Kapoor et al.

(10) Patent No.: US 11,062,385 B2
(45) Date of Patent: Jul. 13, 2021

(54) PROVIDING CODE OFFERINGS INSIDE CODE

(71) Applicant: International Business Machines Corporation, Armonk, NY (US)

(72) Inventors: Meenal Kapoor, New Delhi (IN); Vinayak Sastri, Bangalore (IN); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/107,189

(22) Filed: Aug. 21, 2018

(65) Prior Publication Data
US 2020/0065891 A1 Feb. 27, 2020

(51) Int. Cl.
G06Q 30/08 (2012.01)
G06F 8/75 (2018.01)
G06F 8/73 (2018.01)
G06Q 30/06 (2012.01)

(52) U.S. Cl.
CPC .............. *G06Q 30/08* (2013.01); *G06F 8/73* (2013.01); *G06F 8/75* (2013.01); *G06Q 30/0633* (2013.01)

(58) Field of Classification Search
CPC ........... G06F 8/74; G10L 15/22; G06Q 30/08; G06Q 30/02
See application file for complete search history.

(56) References Cited

U.S. PATENT DOCUMENTS

| | | | |
|---|---|---|---|
| 7,292,990 B2 * | 11/2007 | Hughes | G06F 8/20 705/7.14 |
| 9,369,410 B2 | 6/2016 | Capper et al. | |
| 9,411,803 B2 | 8/2016 | Assulin et al. | |
| 9,588,760 B1 * | 3/2017 | Bostick | G06F 8/71 |
| 2003/0130021 A1 * | 7/2003 | Lydon | G06Q 30/0209 463/9 |
| 2005/0187859 A1 * | 8/2005 | Growney | G06Q 50/188 705/37 |
| 2012/0260263 A1 | 10/2012 | Edoja | |
| 2014/0380268 A1 | 12/2014 | Gabel et al. | |
| 2016/0098649 A1 * | 4/2016 | Ifrach | G06Q 10/02 705/5 |

(Continued)

OTHER PUBLICATIONS

McCauley, Jim. "Get Paid for Open Source Coding in GitHub." Creative Bloq, Creative Bloq, Mar. 17, 2016, web.archive.org/web/20160316074527/www.creativebloq.com/web-design/monetise-your-code-skills-new-github-marketplace-31619627. (Year: 2016).*

*Primary Examiner* — Ryan D Donlon
*Assistant Examiner* — Mark A Malkowski
(74) *Attorney, Agent, or Firm* — Yee & Associates, P.C.

(57) ABSTRACT

Providing code offerings inside code is provided. Intent of an under-developed code within a programming environment is identified by analyzing program documentation and program code corresponding to the under-developed code. The identified intent is published as a request for bids on a network. A ranked list of software codes returned against the request for bids is provided within the programming environment. Each software code in the ranked list of software codes, along with its respective proof that includes library, documentation, and code snippet, is compared with the identified intent for relevance and sorted based on monetary value of its corresponding bid.

20 Claims, 5 Drawing Sheets

(56) References Cited

U.S. PATENT DOCUMENTS

| | | | |
|---|---|---|---|
| 2017/0010888 A1* | 1/2017 | Grushko | G06F 8/33 |
| 2017/0039188 A1* | 2/2017 | Allen | G06F 8/73 |
| 2017/0147291 A1 | 5/2017 | Vega | |
| 2017/0371629 A1 | 12/2017 | Chacko et al. | |
| 2018/0060041 A1 | 3/2018 | Williams et al. | |
| 2019/0140995 A1* | 5/2019 | Roller | G06F 40/295 |

* cited by examiner

PROVIDING CODE OFFERINGS INSIDE CODE

BACKGROUND

1. Field

The disclosure relates generally to software development and more specifically to providing relevant software code offerings inside an incomplete set of software code (e.g., partially developed software code or software code in the process of development) within a software code development environment for completing the incomplete set of software code to provide programmer-desired functionality in a software application or program.

2. Description of the Related Art

Software development is a process by which standalone software is created using a specific programming language. Software development involves writing a series of interrelated programming code, which provides the functionality of the developed software. Software development also may be called application development and software design.

Software development is an iterative logical process that aims to create a computer coded or programmed software to address a unique objective, task, goal, or process. Software development is generally a planned initiative that consists of various steps or stages that result in the creation of operational software.

Software development is primarily achieved through computer programming, which is carried out by a software programmer and includes processes such as initial research, data flow design, process flow design, flow charts, technical documentation, software testing, debugging and other software architecture techniques. This is known as the software development life cycle.

An Integrated Development Environment (IDE) is a program that facilitates application development. In general, an IDE is a graphical user interface-based workbench designed to aid a software programmer in building software applications with an integrated environment combined with all the required tools at hand. Most common IDE features, such as debugging, version control, and data structure browsing, help a software programmer quickly execute actions without switching to other applications. Thus, an IDE helps maximize productivity by providing similar user interfaces for related components and reduces the time taken to learn the programming language. An IDE may support a single programming language or multiple programming languages.

SUMMARY

According to one illustrative embodiment, a computer-implemented method for providing code offerings inside code is provided. A computer identifies intent of an under-developed code within a programming environment by analyzing program documentation and program code corresponding to the under-developed code. The computer publishes the identified intent as a request for bids on a network. The computer provides, within the programming environment, a ranked list of software codes returned against the request for bids, each software code in the ranked list of software codes, along with its respective proof that includes library, documentation, and code snippet, is compared with the identified intent for relevance and sorted based on monetary value of its corresponding bid. According to other illustrative embodiments, a computer system and computer program product for providing code offerings inside code are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
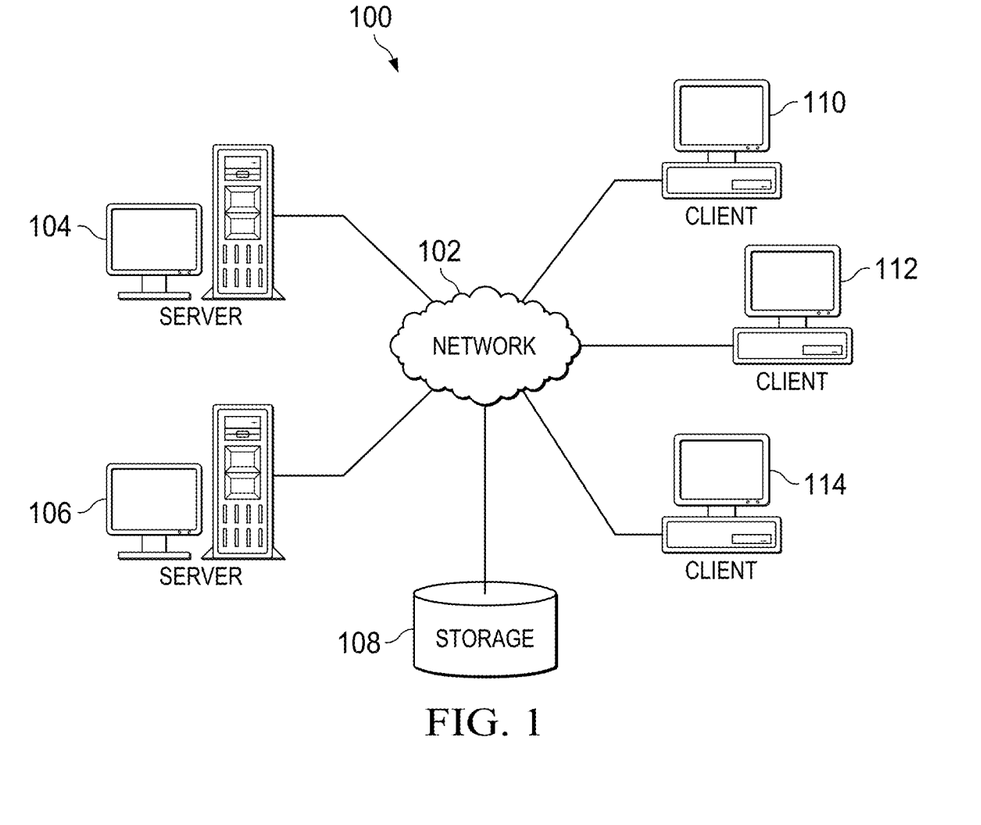
FIG. 1 is a pictorial representation of a network of data processing systems in which illustrative embodiments may be implemented.
Figure 2:
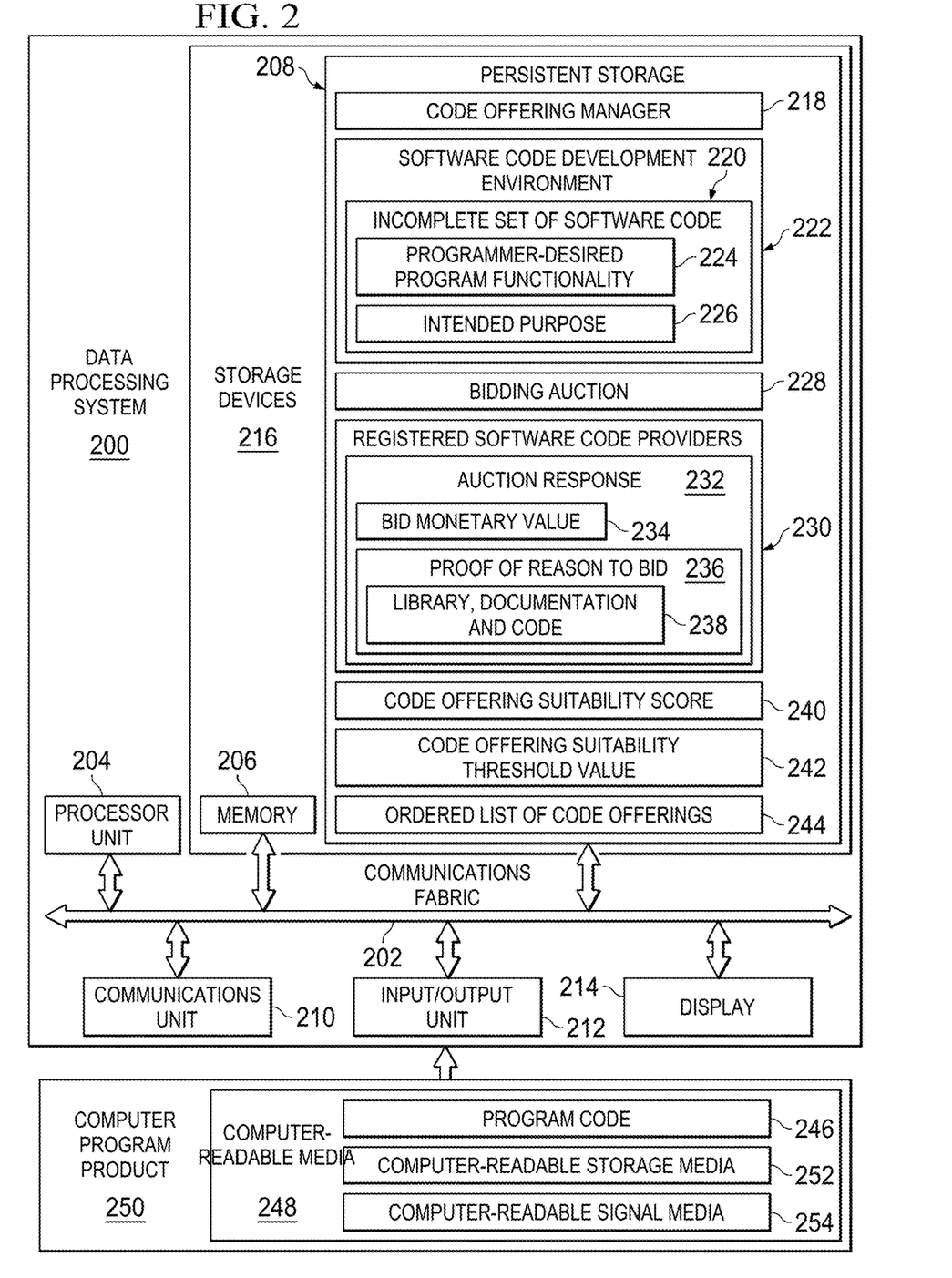
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide a set of services to registered client devices for providing one or more relevant software code offerings inside an incomplete set of software code. Further, server 104 and server 106 may each represent a cluster of servers in a data center. Alternatively, server 104 and server 106 may represent computing nodes in a cloud environment.

Client 110, client 112, and client 114 also connect to network 102. Clients 110, 112, and 114 are registered clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, laptop computers, handheld computers, smart phones, smart watches, smart televisions, and the like, with wire or wireless communication links to network 102.

Users of clients 110, 112, and 114 may utilize clients 110, 112, and 114 to access the code offering services hosted by server 104 and server 106. For example, software programmers corresponding to registered clients may input incomplete sets of software code into software code development environments of server 104 and server 106. Server 104 and server 106 then analyze the incomplete sets of software code, determine intended purposes of the incomplete sets of software code, and launch bidding auctions for software code providers to bid on completing the incomplete sets of software code based on the intended purposes of the incomplete sets of software code. Software code providers corresponding to other registered clients may submit their respective auction responses, which may include bid monetary value and proof of reason to bid comprising a set of libraries, code documentation, code snippets, and the like, to server 104 and server 106. Server 104 and server 106 compare the auction responses with the intended purposes of the incomplete sets of software code and determine auction winners based on the comparisons. Server 104 and server 106 display the proofs of reason to bid of software code provider auction winners inside the incomplete sets of software code within the software code development environments for software programmer review. In addition, server 104 and server 106 may provide other information, such as applications and programs, to clients 110, 112, and 114.

Storage 108 is a network storage device capable of storing any type of data in a structured format or an unstructured format. In addition, storage 108 may represent a plurality of network storage devices. Further, storage 108 may store identifiers and IP addresses for a plurality of client devices; identifiers for a plurality of client device users; software code development environments; incomplete sets of software code, along with intended purposes of the incomplete sets of software code; software code provider auction responses; and the like. Furthermore, storage unit 108 may store authentication or credential data that may include user names, passwords, and biometric data, for example, associated with system administrators and client device users, such as software programmers and software code providers.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores code offering manager 218. However, it should be noted that even though code offering manager 218 is illustrated as residing in persistent storage 208, in an alternative illustrative embodiment code offering manager 218 may be a separate component of data processing system 200. For example, code offering manager 218 may be a hardware component coupled to communication fabric 202 or a combination of hardware and software components. In another alternative illustrative embodiment, a first portion of code offering manager 218 may be located in data processing system 200 and a second portion of code offering manager 218 may be located in a second data processing system, such as client 110 in FIG. 1. In yet another alternative illustrative embodiment, code offering manager 218 may be located in client devices instead of, or in addition, to data processing system 200.

Code offering manager 218 controls the process of providing relevant software code offerings inside incomplete set of software code 220 within software code development environment 222 for completing incomplete set of software code 220 to provide programmer-desired program functionality 224. Incomplete set of software code 220 represents an initial set of program code input into software code development environment 222 by a software programmer utilizing a registered client device. In other words, incomplete set of software code 220 is partially developed software code or software code in the process of development. Software code development environment 222 may represent any type of program, such as, for example, an IDE, for facilitating software application development. Programmer-desired program functionality 224 represents a set of one or more capabilities that the software programmer wants to incorporate into a software application or program that is currently under development within software code development environment 222. In other words, incomplete set of software code 220 is currently unable to provide programmer-desired program functionality 224.

Code offering manager 218 analyzes incomplete set of software code 220 corresponding to programmer-desired program functionality 224 using, for example, natural language processing or other type of word parsing process. Code offering manager 218 generates intended purpose 226 based on the analysis of incomplete set of software code 220 corresponding to programmer-desired program functionality 224. Intended purpose 226 represents the function, task, or action that incomplete set of software code 220 is trying to execute or perform to achieve programmer-desired program functionality 224 in the software application or program that is currently under development within software code development environment 222.

After determining intended purpose 226, code offering manager 218 launches bidding auction 228. Bidding auction 228 represents a website where one or more of registered software code providers 230 may input an auction response 232 for bidding on completing incomplete set of software code 220 for the software programmer. In addition, code offering manager 218 publishes intended purpose 226 on bidding auction 228 for potential software code provider bidders to review prior to submitting bids.

Registered software code providers 230 represent a plurality of different software code providers that are subscribers to bidding auction 228. Registered software code providers 230 are sellers of previously developed software products and assets. If a registered software code provider determines that the registered software code provider has a software product or asset that corresponds to intended purpose 226 of incomplete set of software code 220, then that registered software code provider submits auction response 232.

In this example, auction response 232 includes bid monetary value 234 and proof of reason to bid 236. Bid monetary value 234 represents that amount of money that the particular software code provider is willing to sell the software product or asset for to complete incomplete set of software code 220. In other words, bid monetary value 234 is the potential cost to the software programmer. Proof of reason to bid 236 demonstrates the particular software code provider's reasons for submitting auction response 232. In this example, proof of reason to bid 236 includes library, documentation, and code 238. However, it should be noted that proof of reason to bid 236 may include more or less information than shown. Library, documentation, and code 238 represent, for example: a set of one or more libraries, which is a collection of implementations of behavior, written in terms of a language, that has an interface by which the behavior is invoked; software code documentation that is embedded in the source code and explains how the software code operates; and the software code that is a set of executable instructions.

Code offering manager 218 performs a comparison analysis between each received proof of reason to bid 236 and intended purpose 226 to determine how well each received proof of reason to bid 236 matches intended purpose 226. Then, code offering manager 218 calculates code offering suitability score 240 for each received proof of reason to bid 236 based on the comparison analysis and each corresponding bid monetary value 234. Code offering manager 218 selects each received proof of reason to bid 236 having a code offering suitability score 240 greater than code offering suitability threshold value 242. Code offering suitability threshold value 242 represents a predefined threshold value that indicates a minimum level of suitability of a code offering for completing incomplete set of software code 220. Code offering suitability threshold value 242 may be set by the software programmer, for example. Alternatively, code offering suitability threshold value 242 may be set by code offering manager 218 using machine learning.

Code offering manager 218 places each received proof of reason to bid 236 having a code offering suitability score 240 greater than code offering suitability threshold value 242 in ordered list of code offerings 244. Ordered list of code offerings 244 is a ranked list of proofs of reason to bid from highest-ranking to lowest-ranking proof of reason to bid. It should be noted that ordered list of code offerings 244 may contain zero, one, or more proofs of reasons to bid. If ordered list of code offerings 244 contains one or more proofs of reasons to bid, then code offering manager 218 displays the one or more proofs of reason to bid inside incomplete set of software code 220 within software code development environment 222 for review and possible selection by the software programmer. The software programmer may select (e.g., using a mouse click) any one of the proofs of reason to bid in the ordered list. Upon selection of a proof of reason to bid in the ordered list by the software programmer, library, documentation, and code 238 of the selected proof of reason to bid is implemented inside incomplete set of software code 220 within software code development environment 222. Alternatively, code offering manager 218 may automatically select the highest-ranking proof of reason to bid in ordered list of code offerings 244 and implement library, documentation, and code 238 of the highest-ranking proof of reason to bid to complete incomplete set of software code 220 and provide programmer-desired program functionality 224.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, software programmers are left to their knowledge and understanding of programming languages, libraries, and available off-the-shelf resources when it comes to software programming and choosing which library or libraries to use. However, this current software development process comes with shortcomings. For example, this current software development process relies on a given software programmer's existing knowledge. If the software programmer is not aware of an existing software option that the software programmer could use to develop a software program, then this current software development process leads to an increase in software development time, effort, and cost.

Moreover, established software code providers benefit from a larger presence in the software development market. Hence, new software code providers find it difficult to demonstrate their coding effectiveness, making it harder for these new software code providers to penetrate the software development market and obtain a market share. As a result, a need exists to enable software programmers to become aware of available software options, and receive aligned software products or assets, as they program. In addition, a need exists to empower new software code providers so that these new software code providers can provide their software products and assets to software developers, without being overshadowed by the larger presence of the more established software providers in the software development market.

Illustrative embodiments bridge this gap between new and established software providers by providing a recommendation-based coding model. As an example scenario, a software programmer is creating a spreadsheet application report for a customer account within a software code development environment. In the software code development environment, the software programmer is trying to create a new formula for the spreadsheet application. Therefore, the software programmer writes code, such as, for example, visual basic script, to attain a set of program functionality that the software programmer desires or wants in the spreadsheet application.

To start, the software programmer types a function name inside the code. The function name is indicative of an intended purpose of the code. Illustrative embodiments then make an initial guess as to what the software programmer is trying to accomplish with the code.

The software programmer continues writing the function, naming a variable, and writing a couple of initial lines of code creating an incomplete set of code (e.g., partially developed code or code in the process of development). At this point, illustrative embodiments cross a threshold confidence level regarding the intended purpose of the incomplete set of code developed by the software programmer. In addition, illustrative embodiments may optionally collect additional code context information from the rest of the spreadsheet application that the software programmer writing to assist in identifying the intended purpose of the incomplete set of code.

After identifying the intended purpose of the incomplete set of code, illustrative embodiments open a bidding auction. The bidding auction provides information, such as an input code set (i.e., the incomplete set of code), the intended purpose of the incomplete set of code, and an expected output code set. Software code providers, who are registered subscribers to the bidding auction service, listen for the information corresponding to the bidding auction. Those software code providers who have ready-made software products or assets corresponding to the input code set, may now bid on providing a solution to complete the incomplete set of code. One or more of those software code providers may provide an auction response that includes a proof of reason to bid comprising, for example, a set of one or more libraries, code documentation, code, and the like, corresponding to the intended purpose of the incomplete set of code.

Illustrative embodiments select the highest-scoring software code provider, which illustrative embodiments compute as a combination of bid monetary value and a closest matching proof of reason to bid, as the auction winner. Alternatively, illustrative embodiments may select a top "n" number of auction winners based on their respective scores. Illustrative embodiments then display the proof of reason to bid (e.g., the set of libraries, code documentation, and code) corresponding to the auction winner inside the incomplete set of code within the software code development environment. In response to illustrative embodiments receiving a selection of the proof of reason to bid inside the incomplete set of code by the software programmer, illustrative embodiments automatically implement the set of libraries, code documentation, and code to complete the incomplete set of code to provide the software programmer's desired functionality in the spreadsheet application. However, it should be noted that the software programmer may not select the proof of reason to bid and continue to develop the spreadsheet application on his or her own.

Thus, illustrative embodiments provide code offerings within incomplete sets of code. Analysis of the underdeveloped code inside the software code development environment enables finding the intended purpose of the incomplete set of code. In other words, illustrative embodiments determine an intent of the software programmer in developing a given code at a given point in time. Illustrative embodiments perform the analysis on program code documentation, as well as on the program code (e.g., function names, variable names, file names, program constructs, and the like). Illustrative embodiments may utilize, for example, natural language processing, to identify keywords (e.g., dictionary words) in the function names, variable names, and file names, which are not a part of the program construct. Illustrative embodiments may parse the function names, variable names, and file names into multiple keywords by using, for example, upper-case and lower-case letters, underscores, and the like. By using each identified keyword and sequence of keywords, illustrative embodiments are able to determine a set of one or more intended purposes of the incomplete set of code. Illustrative embodiments publish the one or more intended purposes of the incomplete set of code in the bidding auction. Illustrative embodiments also may publish a summary, hints, or log of the derivation of the intended purpose of the incomplete set of code. Further, alternative illustrative embodiments may obfuscate certain portions of the incomplete set of code containing sensitive information by using, for example, stored policy filters corresponding to the software programmer.

Illustrative embodiments perform a matching process to match proofs of reason to bid, which are provided by software code providers, with the intended purpose of the incomplete set of code, which was identified by illustrative embodiments. This matching process produces a matching score for each proof of reason to bid. The better the match is between a proof of reason to bid and the intended purpose of the incomplete set of code, the higher the matching score will be. Then, illustrative embodiments calculate a code offering suitability score for each auction response. Illustrative embodiments combine the matching score of each proof of reason to bid with its corresponding bid monetary value in the auction response to obtain the code offering suitability score. The higher the matching score is and the lower the bid monetary value is, the higher the code offering suitability score will be.

Illustrative embodiments sort the potential code offerings based upon the code offering suitability score of each potential code offering. Finally, illustrative embodiments display a set of one or more highest-scoring code offerings to the software programmer inside the software code development environment as, for example, a line in the incomplete set of code providing a reason for the selection of the code offering, such as a one-line summary of the selected proof of reason to bid. As a result, illustrative embodiments recommend relevant program codes inside target program codes that are currently being developed by software programmers. Consequently, illustrative embodiments reduce software coding cycles and assist in the efficient generation of effective code within a short period of time and at high speed using the relevant code offerings.

Figure 3A:
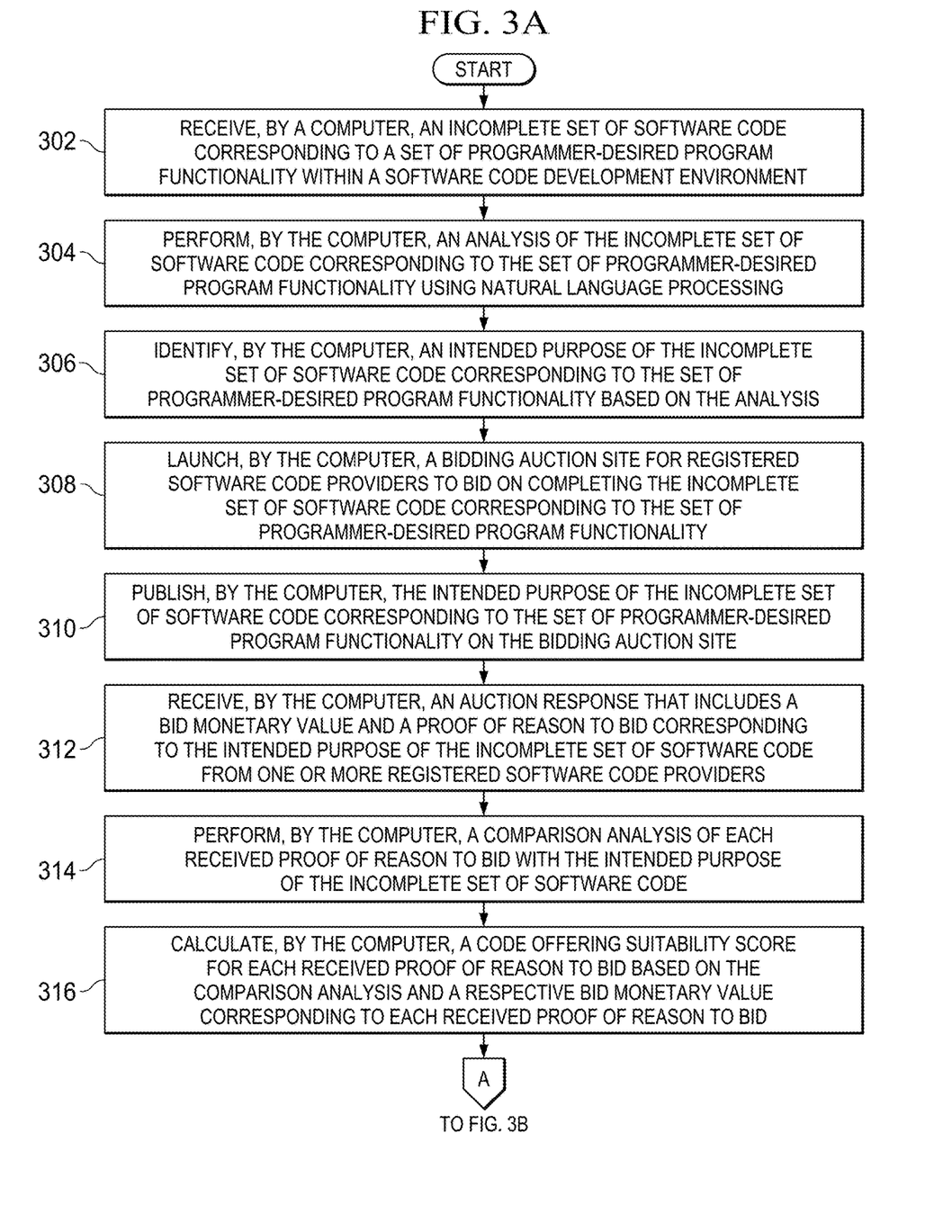
FIGS. 3A-3B are a flowchart illustrating a process for providing code offerings inside code in accordance with an illustrative embodiment.
Figure 3B:
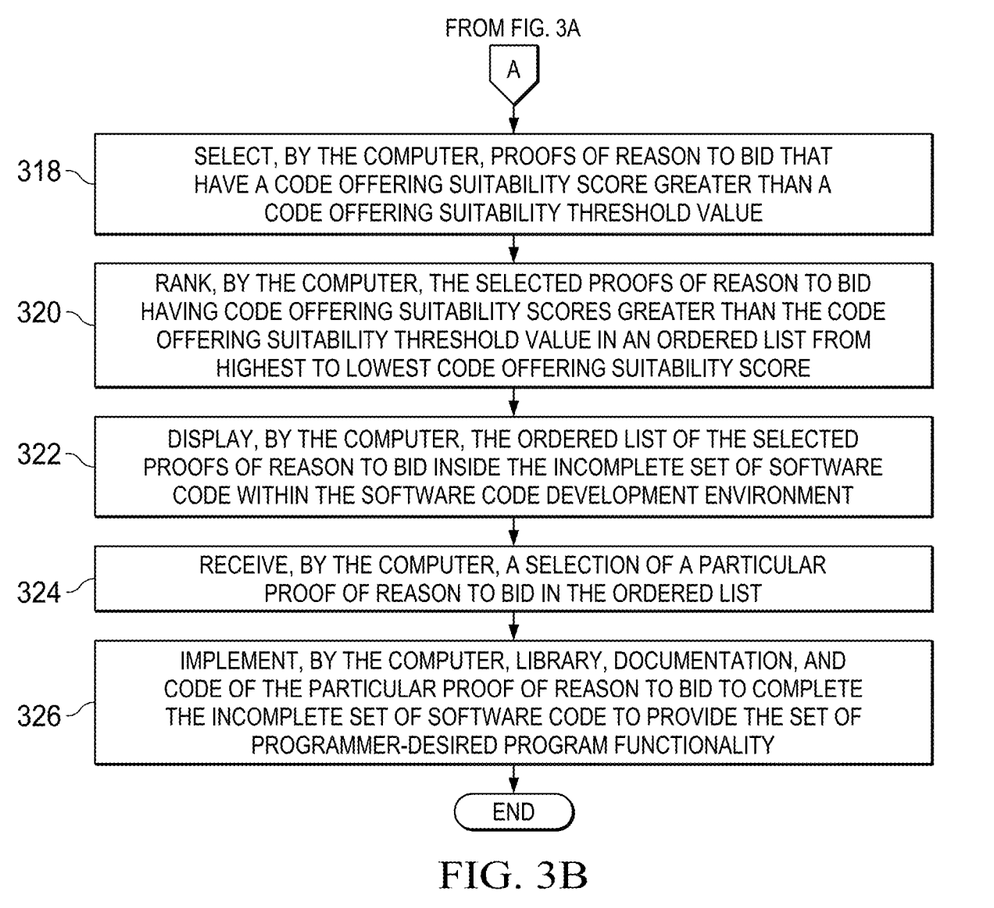

With reference now to FIGS. 3A-3B, a flowchart illustrating a process for providing code offerings inside code is shown in accordance with an illustrative embodiment. The process shown in FIGS. 3A-3B may be implemented in a computer, such as, for example, server 104 in FIG. 1 or data processing system 200 in FIG. 2.

The process begins when the computer receives an incomplete set of software code corresponding to a set of programmer-desired program functionality within a software code development environment (step 302). The incomplete set of software code is partially developed software code or software code in the process of development, for example. The computer performs an analysis of the incomplete set of software code corresponding to the set of programmer-desired program functionality using natural language processing (step 304). The computer identifies an intended purpose of the incomplete set of software code corresponding to the set of programmer-desired program functionality based on the analysis (step 306). The computer may store the intended purpose of the incomplete set of software code in a database for future reference.

Afterward, the computer launches a bidding auction site for registered software code providers to bid on completing the incomplete set of software code corresponding to the set of programmer-desired program functionality (step 308). In addition, the computer publishes the intended purpose of the incomplete set of software code corresponding to the set of programmer-desired program functionality on the bidding auction site (step 310). Subsequently, the computer receives an auction response, which includes a bid monetary value and a proof of reason to bid corresponding to the intended purpose of the incomplete set of software code, from one or more registered software code providers (step 312).

The computer performs a comparison analysis of each received proof of reason to bid with the intended purpose of the incomplete set of software code (step 314). The computer calculates a code offering suitability score for each received proof of reason to bid based on the comparison analysis and a respective bid monetary value corresponding to each received proof of reason to bid (step 316). The computer selects proofs of reason to bid that have a code offering suitability score greater than a code offering suitability threshold value (step 318). Further, the computer ranks the selected proofs of reason to bid having code offering suitability scores greater than the code offering suitability threshold value in an ordered list from highest to lowest code offering suitability score (step 320).

The computer displays the ordered list of the selected proofs of reason to bid inside the incomplete set of software code within the software code development environment (step 322). Subsequently, the computer receives a selection of a particular proof of reason to bid in the ordered list (step 324). In other words, the selection may be any one of the proofs of reason to bid in the ordered list. The computer automatically implements the library, documentation, and code of the particular proof of reason to bid to complete the incomplete set of software code to provide the set of programmer-desired program functionality (step 326). Thereafter, the process terminates.

It should be noted that in an alternative illustrative embodiment, the computer may automatically select the highest-ranking proof of reason to bid in the ordered list and automatically implement the library, documentation, and code of the highest-ranking proof of reason to bid within the incomplete set of software code to provide the set of programmer-desired program functionality and complete the program. As a result, the computer transforms the incomplete set of software code into a complete program with specific functionality.

Figure 4:
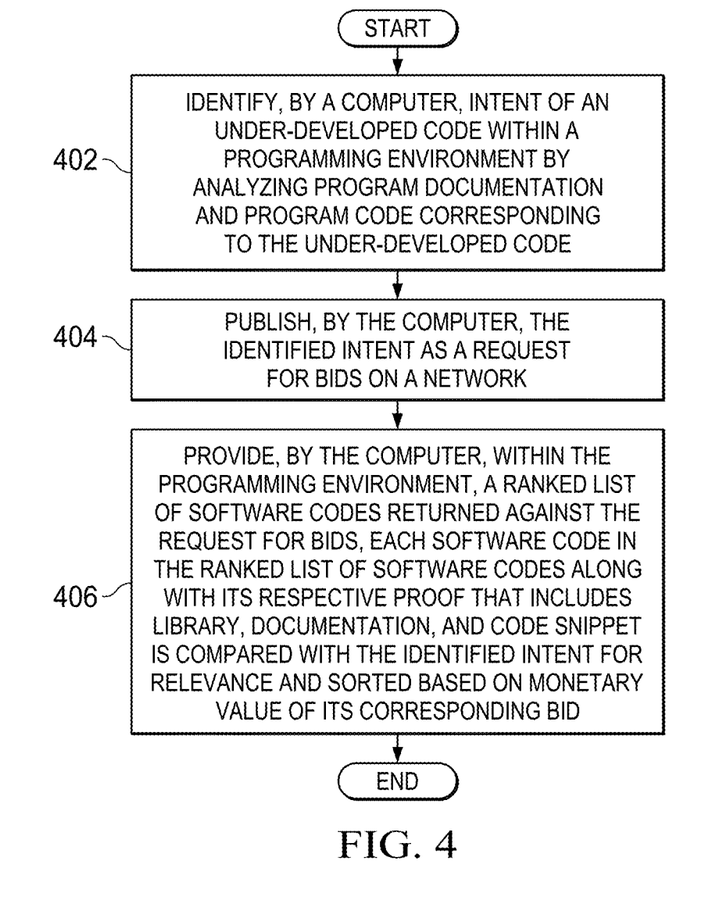
FIG. 4 is a flowchart illustrating a process for displaying a ranked list of software codes within a programming environment in accordance with an illustrative embodiment.

With reference now to FIG. 4, a flowchart illustrating a process for displaying a ranked list of software codes within a programming environment is shown in accordance with an illustrative embodiment. The process shown in FIG. 4 may be implemented in a computer, such as, for example, server 104 in FIG. 1 or data processing system 200 in FIG. 2.

The process begins when the computer identifies intent of an under-developed code within a programming environment by analyzing program documentation and program code corresponding to the under-developed code (step 402). The under-developed code is an incomplete set of software code, partially developed software code, or software code in the process of development that corresponds to programmer-desired program functionality. The computer publishes the identified intent as a request for bids on a network (step 404). The computer displays within the programming environment a ranked list of software codes returned against the request for bids, each software code in the ranked list of software codes, along with its respective proof that includes library, documentation, and code snippet, is compared with the identified intent for relevance and sorted based on monetary value of its corresponding bid (step 406). Thereafter, the process terminates.

Thus, illustrative embodiments of the present invention provide a computer-implemented method, computer system, and computer program product for providing relevant software code offerings inside an incomplete set of software code within a software code development environment to complete the incomplete set of software code to provide programmer-desired program functionality. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing code offerings inside code, the computer-implemented method comprising:

identifying, by a computer, an intent of an under-developed code within a programming environment wherein said under-developed code comprises partially developed software code that is currently unable to provide desired functionality, wherein the partially developed software code comprises one or more of function names, variable names, and file names, wherein identifying the intent of the under-developed code comprises:
identifying words from one or more of function names, variable names, and file names, in the under-developed code, wherein the identified words are not program constructs of any programming language in the under-developed code; and
identifying the intent based on the identified words;
publishing, by the computer, the identified intent as a request for bids on a network; and
providing, by the computer, within the programming environment, a ranked list of software codes returned against the request for bids, each software code in the ranked list of software codes, along with its respective proof that includes library, documentation, and code, is compared with the identified intent for relevance and sorted based on monetary value of its corresponding bid.

2. The computer-implemented method of claim 1 further comprising:
receiving, by the computer, an incomplete set of software code as the under-developed code corresponding to programmer-desired program functionality within the programming environment;
performing, by the computer, an analysis of the incomplete set of software code corresponding to the programmer-desired program functionality using natural language processing; and
identifying, by the computer, an intended purpose of the incomplete set of software code corresponding to the programmer-desired program functionality based on the analysis.

3. The computer-implemented method of claim 2 further comprising:
launching, by the computer, a bidding auction site on the network for registered software code providers to bid on completing the incomplete set of software code corresponding to the programmer-desired program functionality; and
publishing, by the computer, the intended purpose of the incomplete set of software code corresponding to the programmer-desired program functionality on the bidding auction site.

4. The computer-implemented method of claim 2 further comprising:
receiving, by the computer, an auction response that includes the monetary value and respective proof corresponding to the intended purpose of the incomplete set of software code from one or more registered software code providers.

5. The computer-implemented method of claim 2 further comprising:
performing, by the computer, a comparison analysis of each respective proof with the intended purpose of the incomplete set of software code; and
calculating, by the computer, a score for each respective proof based on the comparison analysis and the monetary value corresponding to each respective proof.

6. The computer-implemented method of claim 5 further comprising:
selecting, by the computer, respective proofs that have a corresponding score greater than a threshold value; and ranking, by the computer, selected proofs having corresponding scores greater than the threshold value in an ordered list from highest to lowest score.

7. The computer-implemented method of claim 6 further comprising:
displaying, by the computer, the ordered list of the selected proofs inside the incomplete set of software code within the programming environment;
receiving, by the computer, a selection of a particular proof in the ordered list, wherein the selection is any one of the selected proofs in the ordered list; and
implementing, by the computer, the library, documentation, and code of the particular proof to complete the incomplete set of software code to provide the programmer-desired program functionality.

8. A computer system for providing code offerings inside code, the computer system comprising:
a bus system;
a storage device connected to the bus system, wherein the storage device stores program instructions; and
a processor connected to the bus system, wherein the processor executes the program instructions to:
identify an intent of an under-developed code within a programming environment wherein said under-developed code comprises partially developed software code that is currently unable to provide desired functionality, wherein the partially developed software code comprises one or more of function names, variable names, and file names, wherein the intent of the under-developed code is identified by the processor executing program instructions to:
identify words from one or more of function names, variable names, and file names, in the under-developed code, wherein the identified words are not program constructs of any programming language in the under-developed code; and
identify the intent based on the identified words;
publish the identified intent as a request for bids on a network; and
provide, within the programming environment, a ranked list of software codes returned against the request for bids, each software code in the ranked list of software codes, along with its respective proof that includes library, documentation, and code snippet, is compared with the identified intent for relevance and sorted based on monetary value of its corresponding bid.

9. The computer system of claim 8, wherein the processor further executes the program instructions to:
receive an incomplete set of software code as the under-developed code corresponding to programmer-desired program functionality within the programming environment;
perform an analysis of the incomplete set of software code corresponding to the programmer-desired program functionality using natural language processing; and
identify an intended purpose of the incomplete set of software code corresponding to the programmer-desired program functionality based on the analysis.

10. The computer system of claim 9, wherein the processor further executes the program instructions to:
launch a bidding auction site on the network for registered software code providers to bid on completing the incomplete set of software code corresponding to the programmer-desired program functionality; and
publish the intended purpose of the incomplete set of software code corresponding to the programmer-desired program functionality on the bidding auction site.

11. The computer system of claim 9, wherein the processor further executes the program instructions to:
receive an auction response that includes the monetary value and respective proof corresponding to the intended purpose of the incomplete set of software code from one or more registered software code providers.

12. The computer system of claim 9, wherein the processor further executes the program instructions to:
perform a comparison analysis of each respective proof with the intended purpose of the incomplete set of software code; and
calculate a score for each respective proof based on the comparison analysis and the monetary value corresponding to each respective proof.

13. The computer system of claim 12, wherein the processor further executes the program instructions to:
select respective proofs that have a corresponding score greater than a threshold value; and
rank selected proofs having corresponding scores greater than the threshold value in an ordered list from highest to lowest score.

14. A computer program product for providing code offerings inside code, the computer program product comprising a computer readable storage medium having program instructions embodied therewith, the program instructions executable by a computer to cause the computer to perform a method comprising:
identifying, by the computer, an intent of an under-developed code within a programming environment wherein said under-developed code comprises partially developed software code that is currently unable to provide desired functionality, wherein the partially developed software code comprises one or more of function names, variable names, and file names, wherein identifying the intent of the under-developed code comprises:
identifying words from one or more of function names, variable names, and file names, in the under-developed code, wherein the identified words are not program constructs of any programming language in the under-developed code; and
identifying the intent based on the identified words;
publishing, by the computer, the identified intent as a request for bids on a network; and
providing, by the computer, within the programming environment, a ranked list of software codes returned against the request for bids, each software code in the ranked list of software codes, along with its respective proof that includes library, documentation, and code snippet, is compared with the identified intent for relevance and sorted based on monetary value of its corresponding bid.

15. The computer program product of claim 14 further comprising:
receiving, by the computer, an incomplete set of software code as the under-developed code corresponding to programmer-desired program functionality within the programming environment;
performing, by the computer, an analysis of the incomplete set of software code corresponding to the programmer-desired program functionality using natural language processing; and
identifying, by the computer, an intended purpose of the incomplete set of software code corresponding to the programmer-desired program functionality based on the analysis.

16. The computer program product of claim 15 further comprising:
- launching, by the computer, a bidding auction site on the network for registered software code providers to bid on completing the incomplete set of software code corresponding to the programmer-desired program functionality; and
- publishing, by the computer, the intended purpose of the incomplete set of software code corresponding to the programmer-desired program functionality on the bidding auction site.

17. The computer program product of claim 15 further comprising:
- receiving, by the computer, an auction response that includes the monetary value and respective proof corresponding to the intended purpose of the incomplete set of software code from one or more registered software code providers.

18. The computer program product of claim 15 further comprising:
- performing, by the computer, a comparison analysis of each respective proof with the intended purpose of the incomplete set of software code; and
- calculating, by the computer, a score for each respective proof based on the comparison analysis and the monetary value corresponding to each respective proof.

19. The computer program product of claim 18 further comprising:
- selecting, by the computer, respective proofs that have a corresponding score greater than a threshold value; and
- ranking, by the computer, selected proofs having corresponding scores greater than the threshold value in an ordered list from highest to lowest score.

20. The computer program product of claim 19 further comprising:
- displaying, by the computer, the ordered list of the selected proofs inside the incomplete set of software code within the programming environment;
- receiving, by the computer, a selection of a particular proof in the ordered list, wherein the selection is any one of the selected proofs in the ordered list; and
- implementing, by the computer, the library, documentation, and code of the particular proof to complete the incomplete set of software code to provide the programmer-desired program functionality.

\* \* \* \* \*